Patented Dec. 31, 1940

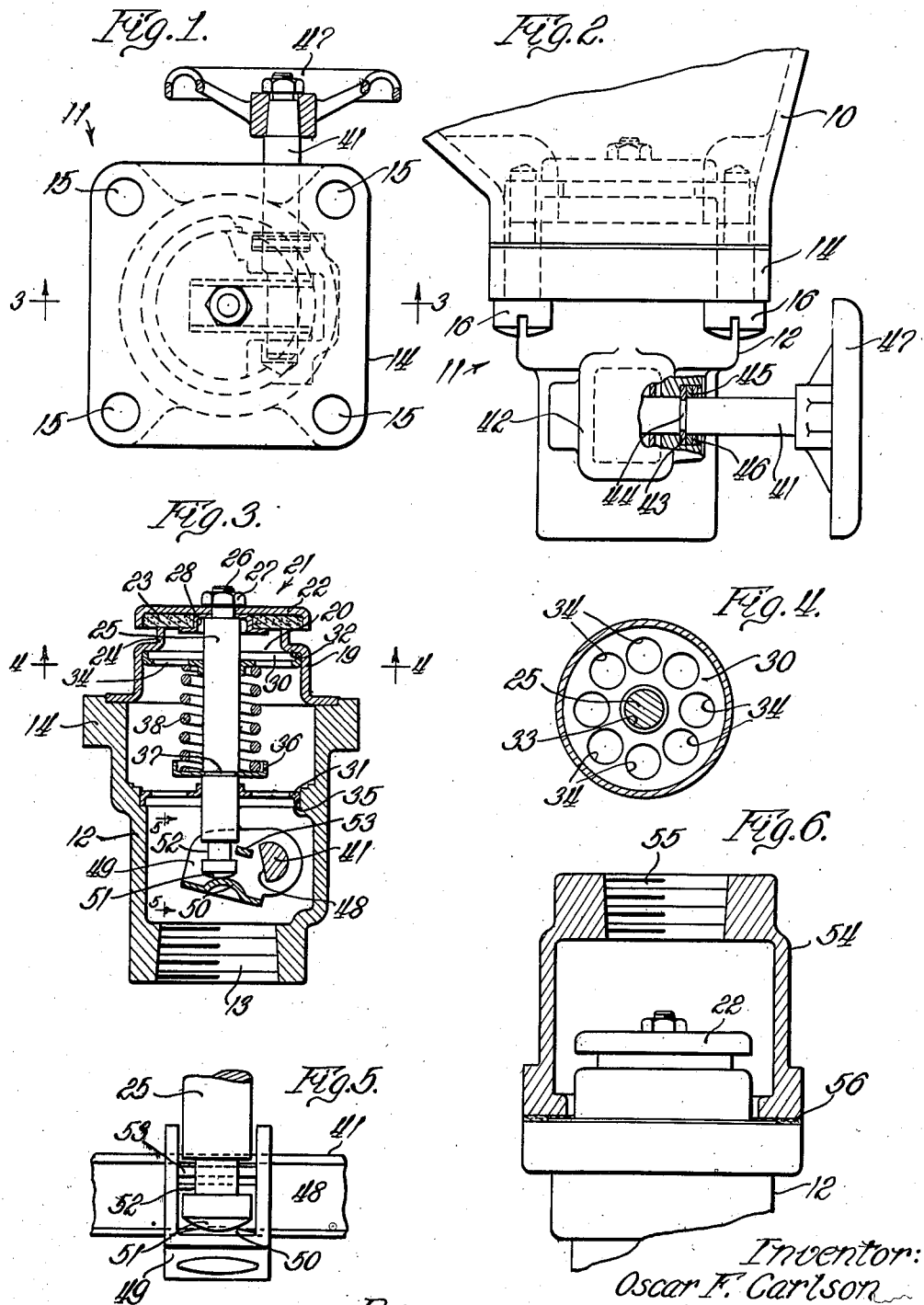

2,226,843

UNITED STATES PATENT OFFICE 2,226,843

VALVE CONSTRUCTION

Oscar F. Carlson, Kenilworth, Ill., assignor of one-half to Oscar F. Carlson Company, Chicago, Ill., a corporation of Illinois, and one-half to Everett N. McDonnell, Chicago, Ill.

Application November 20, 1939, Serial No. 305,235

2 Claims. (Cl. 251—40)

My invention relates generally to fluid flow control valves and it has particular relation to blow off valves for pressure vessels, such as boilers.

The object of my invention, generally stated, is to provide a blow off valve that shall be simple and efficient in operation and which can be readily and economically manufactured and installed.

Another object of my invention is to so construct a blow off valve that it will lift dirt, sediment, etc., collected above it, and will be substantially self-cleaning.

A further object of my invention is to provide for manually opening and closing a blow off valve in a new and improved manner.

Still another object of my invention is to position all of the operating parts of a blow off valve on the side away from the pressure side.

Other objects of my invention will, in part, be obvious and, in part, appear hereinafter.

Accordingly my invention is disclosed in the embodiments thereof shown in the accompanying drawing and it comprises the features of construction, combination of elements and arrangement of parts which will be exemplified in the constructions hereinafter set forth and the scope of the application of which will be indicated in the appended claims.

For a more complete understanding of the nature and scope of my invention reference may be had to the following detailed description taken in connection with the accompanying drawing, in which:

Figure 1 is a top plan view of a blow off valve embodying my invention;

Figure 2 is a view in side elevation of the blow off valve shown in Figure 1, illustrated in conjunction with a portion of a pressure vessel such as a boiler;

Figure 3 is a longitudinal sectional view taken along the line 3—3 of Figure 1;

Figure 4 is a detail sectional view taken along the line 4—4 of Figure 3;

Figure 5 is a view, on an enlarged scale, taken along the line 5—5 of Figure 3; and Figure 6 is a longitudinal sectional view similar to that shown in Figure 3 and illustrating a modification of the invention.

Referring now particularly to Figures 1 and 2 of the drawing, it will be observed that the reference character 10 designates a portion of a pressure vessel, such as a boiler, and that it is intended to represent the portion thereof which has the lowest point where dirt and sediment tend to collect and where an opening is provided for blowing down the vessel as is customary. A blow off valve, shown generally at 11, is located at this low point in order to permit blowing down the vessel 10 if and when desired.

The valve 11 comprises a valve body 12 that may be formed of cast iron and it has an opening 13, Figure 3, at its lower end to permit discharge therethrough. The valve body 12 is provided with an integrally formed flange 14 having apertures 15 therein for receiving machine screws 16 which are threaded in suitably tapped apertures in the housing of the vessel 10.

As shown more clearly in Figure 3 of the drawing, an inwardly stepped valve seat 19 is positioned on the upper end of the valve body 12. The valve seat 19 may be formed of any suitable material, such as brass, which can be readily formed and shaped to the structure shown. The valve seat 19 provides an aperture 20 through which the fluid from the vessel 10 flows when the valve is opened. A valve disc, shown generally at 21, is provided for closing the valve opening 20. It comprises a valve disc cup 22, formed preferably of brass, which contains packing 23 of a suitable composition such as "Neoprene." As shown, the packing 23 is arranged to engage the lip 24 of the valve seat 19.

Depending from the valve disc 21 is a valve stem 25, preferably in the form of a brass rod, the threaded reduced upper end 26 of which projects through the cup 22 and is held in position thereat by a nut 27. A valve disc washer 28 through which the reduced upper end 26 of the valve stem 25 also projects interfits with the packing 23 to hold it in place.

The valve stem 25 is guided by a pair of valve stem guide members 30 and 31. It will be noted that the guide member 30 is positioned in the inwardly stepped valve seat 19 underneath the portion 32 thereof, and that it is provided with a central opening 33, Figure 4, through which the valve stem 25 is slidably movable. The guide member 30 is provided with apertures 34 the sum of whose areas is substantially equal to the area of the valve opening 20 through which fluid is permitted to flow when the valve disc 21 is raised.

The lower valve guide member 31 is identical in construction with the upper valve guide member 30 and is positioned in a suitable recess 35 in the valve body 12. The guide members 30 and 31 are preferably formed of brass so that they can be punched or otherwise readily shaped as shown.

A spring washer 36 is mounted on the valve stem 25 in a suitable peripheral groove 37. A coil compression spring 38 surrounds the valve stem 25 and reacts between the spring washer 36 and the under side of the valve stem guide member 30 for biasing the valve disc 21 to the closed position. It will be understood that the force due to the pressure in the vessel 10 also acts on the valve disc 21 to close it. This force is in addition to the biasing force of the spring 38.

With a view to providing for moving the valve disc 21 off of the valve seat 19 to open the valve a shaft 41 is rotatably mounted transversely of the valve body 12 in a hollow boss 42 that is formed integrally with the valve body 12. As shown more clearly in Figure 2 of the drawing, a washer 43 is provided in a suitable groove 44 in the shaft 41 and it reacts against a side wall of the boss 42 for holding the shaft 41 in a predetermined axial position. A suitable packing washer 45 serves together with a seal washer 46 to hold the washer 43 in place. Portions of the edge around the opening through which the shaft 41 projects are staked or deformed on to the washer 46 for holding it securely in place. A hand wheel 47 is provided on the outer end of the shaft 41 to permit manual operation.

Referring again to Figure 3 of the drawing, it will be observed that a portion of the shaft 41 inside of the boss 42 is slabbed off, as indicated at 48, in order to non-rotatably engage a valve lifter 49 which, as shown more clearly in Figure 5, is generally U-shaped with the bottom of the U being curved upwardly, as indicated at 50, to provide substantially point contact engagement with the convex lower end 51 of the valve stem 25. The valve lifter 49 is preferably formed of brass.

In order to provide for manually moving the valve stem 25 to the closed position the lower end thereof is provided with a transversely extending notch 52 in the form of a peripheral groove for receiving a valve closing bar 53 that extends between the sides of the U-shaped valve lifter 49. The valve closing bar 53 is secured in the valve lifter 49 by any suitable means, such as by having its ends project through the sides and suitably held thereat.

It will be observed that all of the valve operating mechanism is positioned below the valve disc 21 and on the side thereof that is away from the side to which pressure is applied from the pressure vessel 10. The only movable part of the valve which comes into contact with the dirt and sediment in the bottom of the pressure vessel 10 is the valve disc 22, and, therefore, the valve is not likely to become clogged as would otherwise be the case if the movable parts were otherwise positioned. Further, it will be observed that the valve disc 22 when it is moved upwardly on turning of the hand wheel 47 is essentially self-cleaning since the dirt and sediment which may be lifted by the valve disc 21 and which may be around the valve seat 19 will be quickly blown out through the openings 34 in the valve stem guide members 30 and 31 and out of the lower opening 13 in the valve body 12.

It will be understood that the majority of the specially formed parts, such as the valve seat 19, the valve disc cup 22, the valve disc washer 28, the valve stem guide members 30 and 31, the U-shaped valve lifter 49 are formed of relatively thin sheet brass which can be readily formed to the shapes illustrated.

In Figure 6 of the drawing the valve 11 is shown as arranged for universal use by the provision of the generally tubular valve connector 54. The valve connector 54 is preferably formed of cast iron and is provided with a threaded opening 55 which permits an inlet connection thereto as desired. The valve 11 can be secured to the valve connector 54 by any suitable means such as by the machine screws 16 as shown in Figure 2. A gasket 56 of suitable composition may be provided between the juxtaposed faces of the valve body 12 and the valve connector 54 to provide a sealed connection therebetween.

Since certain further changes may be made in the foregoing constructions and different embodiments of the invention may be made without departing from the scope thereof, it is intended that all matter shown in the accompanying drawing and described hereinbefore shall be interpreted as illustrative and not in a limiting sense.

I claim as my invention:

1. In a valve construction, in combination, a movably mounted valve stem adapted to carry a valve disc at one end for closing a valve opening and having a transverse slot at the other end, a shaft extending transversely of said valve stem, a generally U-shaped operating member carried by and movable with said shaft with the bottom of the U arranged to engage said other end of said valve stem for moving it in one direction, and a member extending between the sides of the U and interfitting with said transverse slot for moving said valve stem in the opposite direction.

2. In a valve construction, in combination, a movably mounted valve stem adapted to carry a valve disc at one end for closing a valve opening and having a transverse slot at the other end, a shaft extending transversely of said valve stem, a generally U-shaped operating member carried by and movable with said shaft with the bottom of the U having a raised portion for engaging said other end of said valve stem for moving it in one direction, and a member extending between the sides of the U and interfitting with said transverse slot for moving said valve stem in the opposite direction.

OSCAR F. CARLSON.